Feb. 18, 1936.　　　R. R. BISHTON　　　2,030,846
ADJUSTABLE BURNISHING REAMER
Filed April 30, 1934　　　4 Sheets-Sheet 1
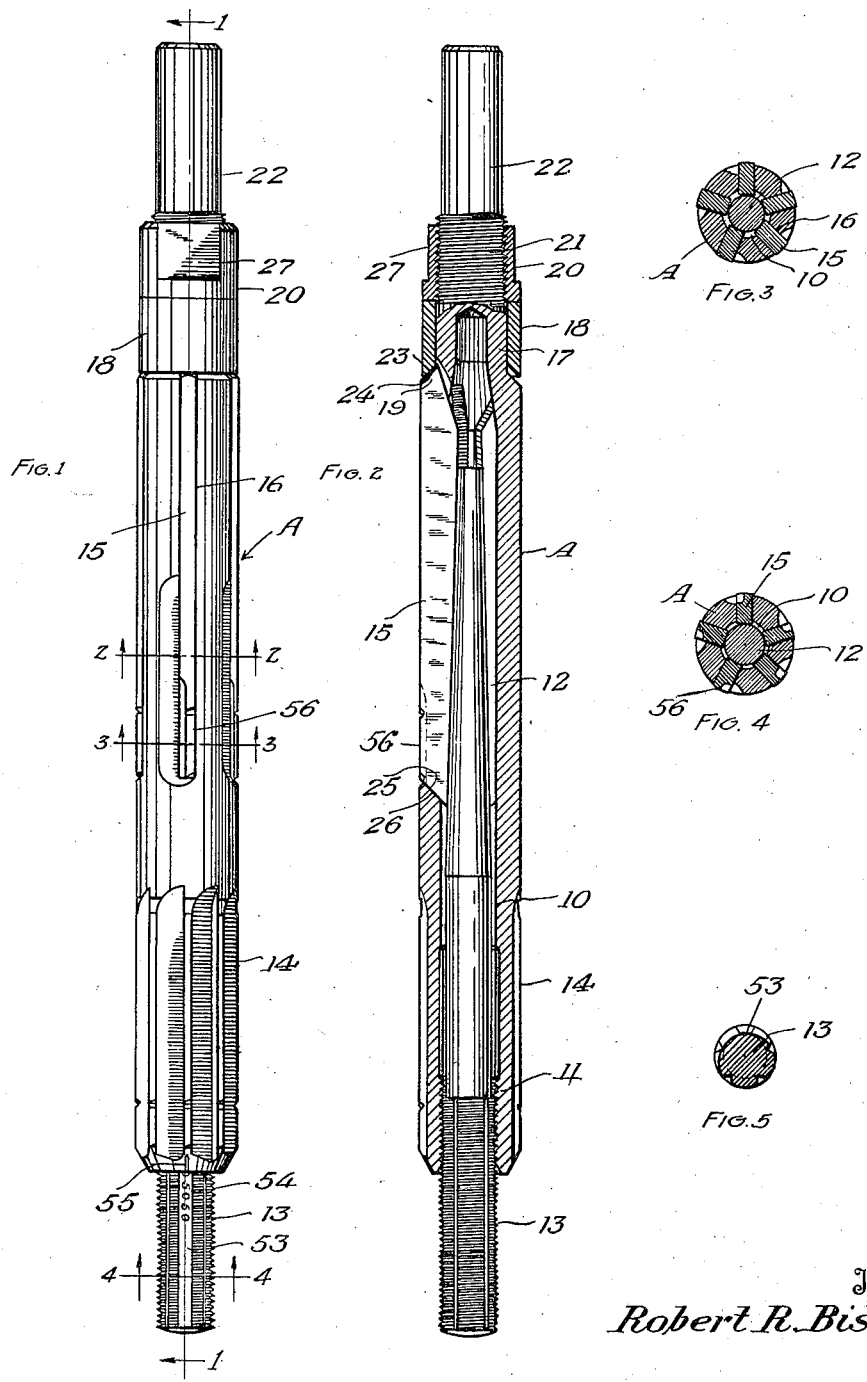
Inventor
Robert R. Bishton
By Victor J. Evans & Co.
Attorneys

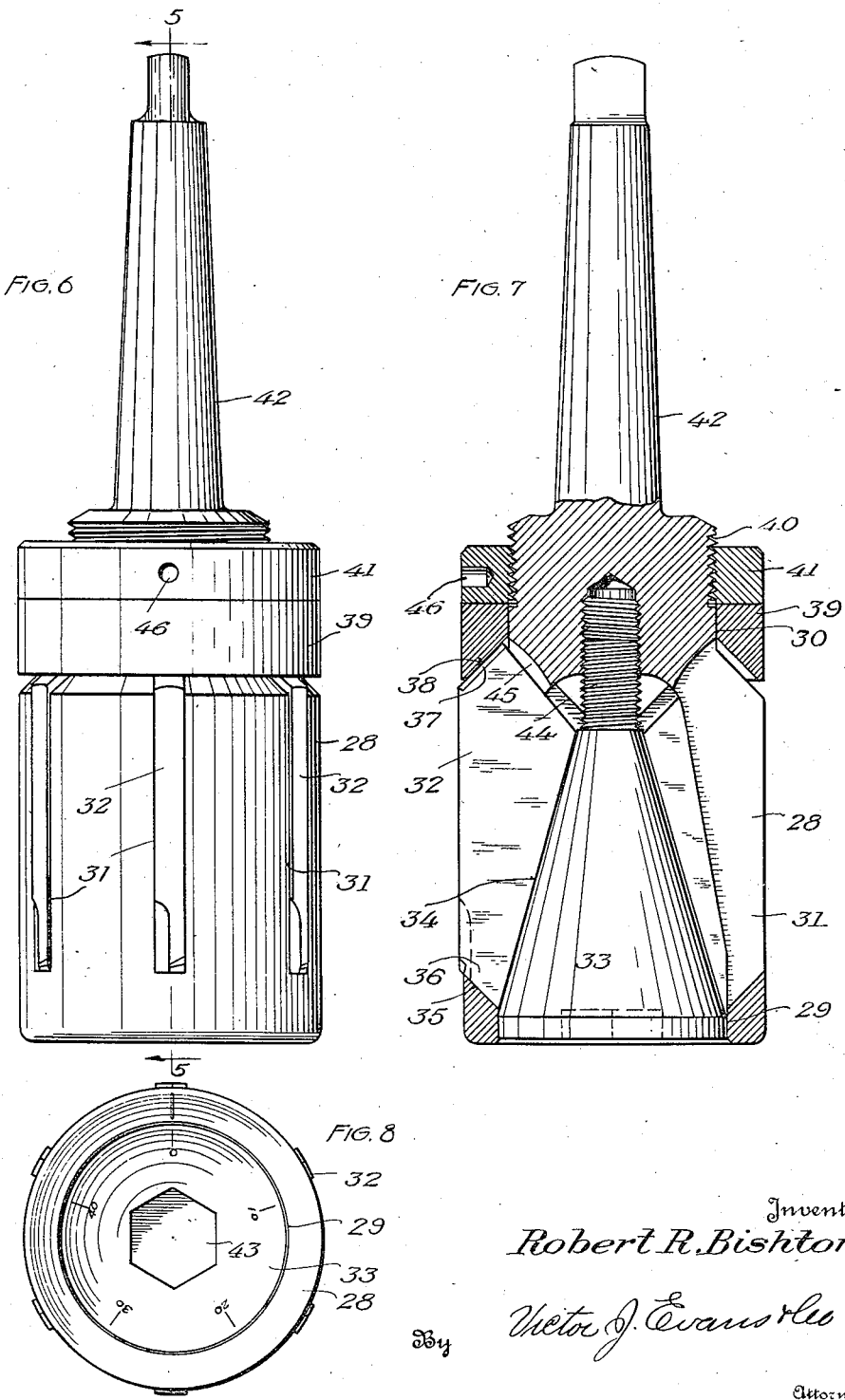

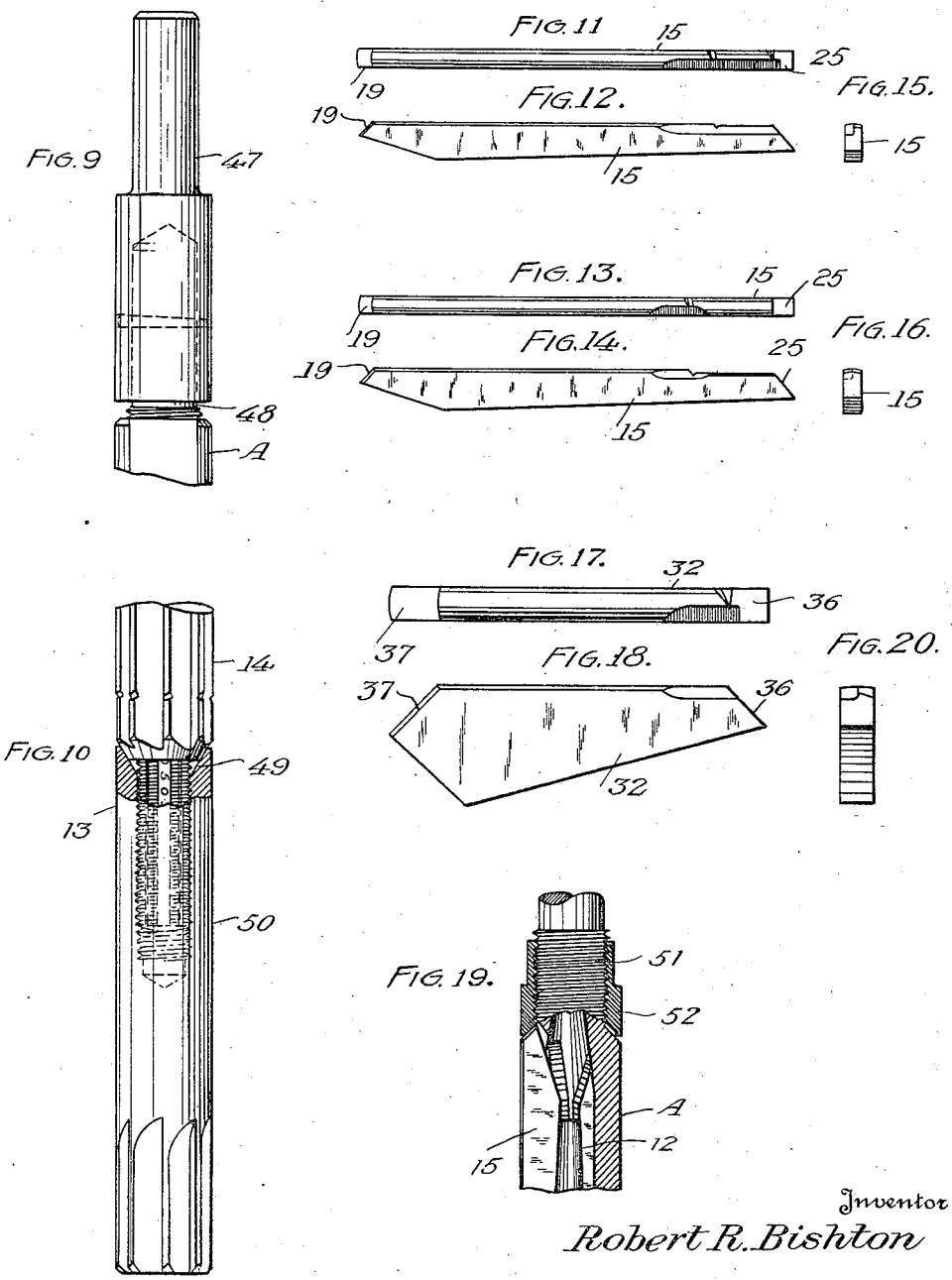

Feb. 18, 1936.    R. R. BISHTON    2,030,846
ADJUSTABLE BURNISHING REAMER
Filed April 30, 1934    4 Sheets-Sheet 4
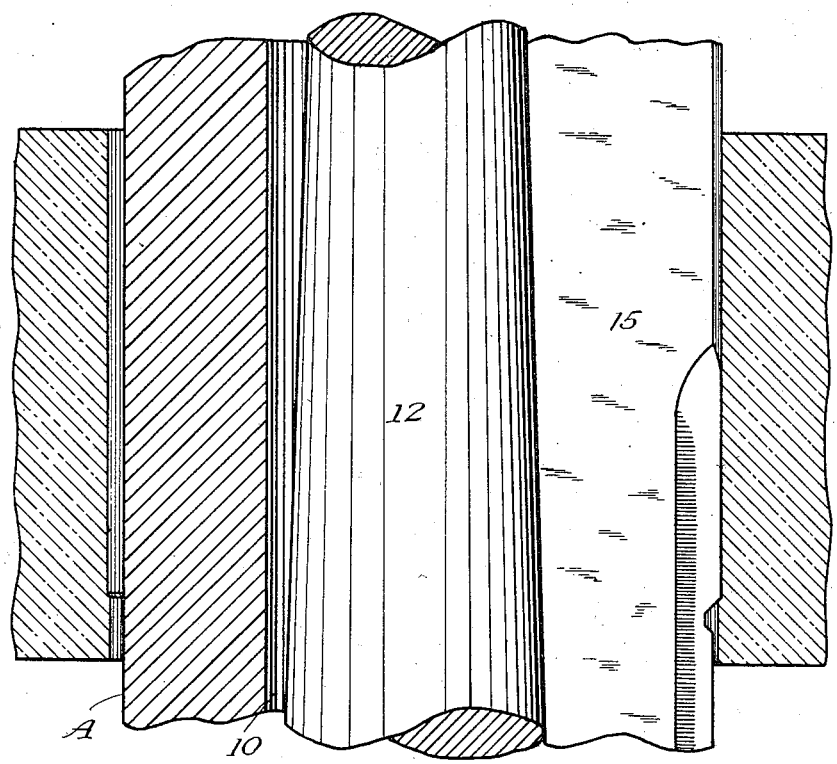
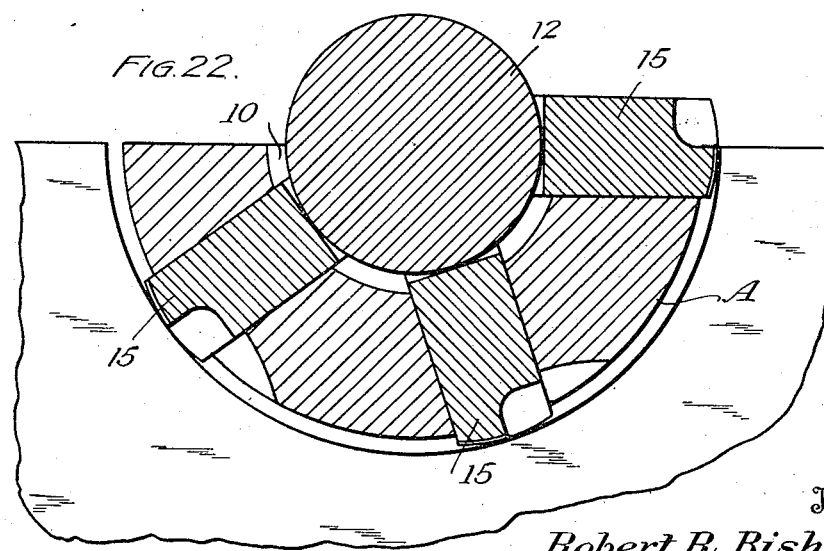
Inventor
Robert R. Bishton Patented Feb. 18, 1936

2,030,846

UNITED STATES PATENT OFFICE 2,030,846

ADJUSTABLE BURNISHING REAMER

Robert R. Bishton, Herkimer, N. Y.

Application April 30, 1934, Serial No. 723,269

1 Claim. (Cl. 77—76)

The invention relates to a reamer and more especially to an adjustable burnishing reamer.

Heretofore it has been found that successful reaming can only be done by two methods, viz: boring with a point or points, or, scraping with a sharp edge or edges. A tool with teeth or lands relieved to sharp edges is used for hand fitting or a very slow power drive. This type of tool shaves a thin, curling chip, usually as long as the bearing being reamed, and finishes a smooth clean hole. Due to the scraping action of the several blades at the same time, only a slight amount of stock can be removed without chattering. Reamers used in power equipment at all reasonable speeds cut on points at the foremost end of the tool. These points are formed by the lands or teeth ground cylindrically and given back and side clearance to provide a high point at the tip of each tooth. When cutting each of these small points take a small chip, like fillings, which make it possible to remove a maximum amount of stock in each cut. This type of reamer, whether expansible or solid, is designated as a machine type and a rose reamer. The other, as a solid or expansion hand reamer. The only objection to the machine type reamer has been that the points leave minute rings on the wall of the hole as the reamer spirals through the work.

The primary object of the present invention is the provision of a tool of this character, wherein in the reaming operation there will be no rings remaining in the hole. This is accomplished by the construction of the faces of the blades whose cutting points actually make the rings but burnish them out as the work passes the points upon the full section of each blade.

Another object of the invention is the provision of a tool of this character wherein the assembly of the same is novel in form and enables adjustment or expansion with dispatch, there being provided a micrometer to permit setting of the blades by scale.

A further object of the invention is the provision of a tool of this character, wherein the blades are easily removed, permitting the cutting points to be sharpened by grinding away a slight amount of metal from the face of the gash renewing the point, the tool when in operation cutting smoothly and evenly.

A further object of the invention is the provision of a tool of this character which is extremely simple in construction, thoroughly reliable and efficient in its purpose, strong, durable, readily and easily adjusted, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 1 is an elevation of a pilot type reamer constructed in accordance with the invention.

Figure 2 is a longitudinal sectional view, taken on the line I—I of Figure 1 looking in the direction of the arrows.

Figure 3 is a sectional view on the line 2—2 of Figure 1 looking in the direction of the arrows.

Figure 4 is a sectional view on the line 3—3 of Figure 1 looking in the direction of the arrows.

Figure 5 is a sectional view on the line 5—5 of Figure 1 looking in the direction of the arrows.

Figure 6 is an elevation of a pilotless type of reamer constructed in accordance with the invention.

Figure 7 is a fragmentary vertical sectional view thereof.

Figure 8 is an end view of the reamer shown in Figure 6.

Figure 9 is a fragmentary elevation of the shank end of the reamer with an extension screw to the shank.

Figure 10 is a fragmentary elevation of the forward end of a reamer equipped with the pilot extension.

Figure 11 is an edge view of one blade having a pilot and two cutting points.

Figure 12 is a side elevation thereof.

Figure 13 is an edge elevation of a blade without the pilot and having a cutting portion only at its forward point.

Figure 14 is a side elevation thereof.

Figure 15 is an end view of the blade shown in Figures 11 and 12.

Figure 16 is an end view of the blade shown in Figures 13 and 14.

Figure 17 is an edge elevation of the blade without the pilot and cutting only at the forward point.

Figure 18 is a side elevation thereof.

Figure 19 is a fragmentary vertical sectional view through the shank end of a reamer, showing in detail the locking nut when the blade retaining ring is in use.

Figure 20 is an end view of the blade shown in Figures 17 and 18.

Figure 21 is a fragmentary longitudinal sectional view taken through the reamer between the section lines 2—2 and 3—3 of Figure 1.

Figure 22 is a fragmentary transverse sectional view of a reamer finishing a hole and is that portion of the tool between the section lines 2—2 and 3—3 of Figure 1.

Similar reference characters indicate corresponding parts throughout the several views in the drawings.

Referring to the drawings in detail, particularly Figures 1 to 5 inclusive, A designates generally the body of the reamer having an axial bore 10 centrally thereof and this bore is threaded, at 11, either at the foremost end or at the inner end. Received in the bore is the expanding plug 12 which has the threaded portion 13 engaging the threads 11 in the bore 10 of the body A, so that the plug can be worked inwardly or outwardly relative to the body.

The body A is provided with end teeth 14 which serve to rough out the metal in the work, removing the bulk of the stock and leaving but a few thousand to be removed and finished by the series of blades 15 carried in the body A. The blades 15 are fitted in slots 16 formed longitudinally of the body A and spaced an equidistance apart.

The body A is formed with a reduced portion 17. The ring 18 is held in position against the ends 19 of the blades 15 by a lock nut 20, threaded at 21 upon the portion 22. This ring 18 is beveled, at 23, and likewise the ends 19 of the blades are beveled, at 24, correspondingly to the bevel 23, so that when the ring 18 is forced inwardly by the nut 20 and these beveled surfaces 23 and 24 cooperate with each other the blades 15 will be forced into contact with the plug 12. The other ends of the blades are beveled, at 25, and likewise the slots for the beveled ends 26 cooperating therewith, so that the said blades when acted upon by the ring 18 will be driven inwardly against the plug 12 which can be worked inwardly of the body A of the ring. The plug 12 is tapered in one direction and constitutes an expanding plug for the blades. The blades 15 are expanded or reduced by adjustment of the lock nut 20 and also by turning the expanding plug 12 by hand, either inwardly or outwardly according to the desired setting, while the lock nut then will secure the blades in their adjusted position. The lock nut 20 is formed with a wrench-engaging portion 27 to permit convenient tightening or loosening thereof by use of a wrench.

In Figures 6 and 8 of the drawings there is shown a pilotless type of reamer or boring head which includes a body 28 open at one end 29 and closed at the other end 30, while between these ends and formed longitudinally of the body are slots 31 for the blades 32 which fit therein, the slots being extended. Fitted through the open end 29 of the body 28 is a conical-shaped expanding plug 33 against which play the blades 32, the heel edges 34 of the latter being correspondingly beveled to the plug 33, while the closed ends of the slots 31 are formed with inwardly beveled portions 35 against which play correspondingly beveled portions 36 of the blades 32, the opposite ends of the blades being provided with beveled portions 37 for engagement of the correspondingly beveled face 38 of a slide ring 39. This slide ring embraces the reduced end 30 of the body 28, which reduced end is threaded, at 40, for the fitting of a lock nut 41 thereon to act against the slide ring 39. The reduced end 30 of the body 28 has a tapered shank 42, this being conventional in form. The plug 33 at its wider end is formed with a wrench socket 43 for a wrench, while the inner reduced end 44 of this plug is screwed into a companion threaded socket 45 in the reduced end 30 of the body 28. Thus it will be seen that by adjusting the plug 33 in the body 28 the blades 32 can be expanded and, further, the said blades 32 can be worked inwardly of the body 28 by adjustment of the slide ring 39, the lock nut 41 being formed with a spanner socket 46 for the convenient turning thereof.

In Figure 9 of the drawings there is shown an extension 47 secured to the shank end 48 of a reamer of the kind disclosed in Figures 1 and 2 and this extension permits of the use of the reamer for line reaming, as should be obvious.

In Figure 10 of the drawings the forward end 49 of the reamer shown in Figures 1 and 2 has fitted therewith a pilot extension 50 for line reaming, the said extension being detachable and only used for preliminary aligning.

In Figure 14 of the drawings the shank end 51 of the reamer of that type in Figures 1 and 2 is equipped with the lock nut 52 of that type functioning as a blade retaining ring in substitute for the ring 18 and the lock nut 20 in said Figures 1 and 2.

In Figures 21 and 22 the cutting action of the blades of the reamer as shown in Figures 1 to 5 of the drawings and the burnishing of the hole as formed by the reamer will eliminate rings in the hole and have the wall thereof smooth and even.

On the plug 12 at its end portion 13 following a flat face 53 is indicated a micrometer scale 54 coacting with a pointer 55 on the outer end of the body 10 of the reamer and through the use of the scale and pointer the blades 15 can be properly set. The number of threads per inch on the expander plug are coordinated with a certain taper per inch to provide a positive number of thousands with each complete turn of the plug from or to the pointer 51 on the outer tapered end of said body 10 of the reamer.

In order to burnish it is necessary that only a rounded surface, with pressure, is in contact with the metal to be burnished, therefore, in ream burnishing it is essential that the cutting is snug or tight enough so that the wall of the hole will rub hard on the burnishing portion of the blade. To this end the construction is designed.

It will be seen that the blade slots in the body 10 of the reamer are cut radially of said body and that the forward ends of the blades are milled approximately one-half of the width of the blade which brings the edge of this cut directly on the center line of the tool. The edge of this cut and the gash angularly across its outer face form the cutting point similar, or rather identical, to the cutting points on any machine reamer. The cut-away section is long enough to permit several sharpenings of the point, but that is all, the object being, in the make-up of the blade, to keep the burnishing surface as indicated at 56 as near to the points as feasible because a slight back taper is necessary for the cutting points to cut free and the harder the wall of the hole bears against the full section of the blade, the better burnishing produced, therefore, pressure enough to burnish would be lost if the full section did not begin just back of the points. The reason for cutting half or any portion of the blade away and not using the side of the blade (positioned on center) as the cutting face is to secure a rounded surface for burnishing which will be on center and adaptable to burnish any hole within the range of the reamer. If the edge or side of the blade were located radially and gashed for a cutting point, the outer surface would have a radius of the size at which it was ground, but if the radius was greater than the radius of the hole the back edge of the blade would be higher than the cutting point and drag, likewise, if the radius on the top of this blade were smaller than the radius of the hole it would provide clearance for the side of the blade its full length and instead of burnishing would cut similar to a hand reamer. It is absolutely necessary to keep the two sides of the blade some distance ahead and back of the center line and point. The blades are assembled and ground cylindrically slightly smaller in diameter than the smallest hole the pilot of the tool will enter, which makes it necessary to adjust the blades outward for use. This provides a radius on the blade smaller than the hole in which it is used, thereby causing the edges of the blade or the line made by the sides and radius to be lower than the center of the radius and not in contact with the wall of the hole, this being obvious from Figures 21 and 22 of the drawings.

From the foregoing it is thought that the manner and operation of the tool as hereinbefore described will be clearly understood and, therefore, for the sake of brevity, further explanation has been omitted.

What is claimed is:

In a tool of the character described a longitudinal slotted reamer body and a cutting blade adjustably fitting the slot in said body and provided with spaced longitudinal sides and an outer face curved upon a radius slightly smaller than that of an opening to be reamed, a portion of the blade at its front end and leading side being removed to present a longitudinal edge midway between the sides of the blade and a transverse notch cut through the outer face of said portion providing a cutting edge and clearance therefor, the rear end portion of the blade constituting a burnishing surface for the reamed bore.

ROBERT R. BISHTON.